United States Patent [19]

Driedger

[11] Patent Number: 4,563,844
[45] Date of Patent: Jan. 14, 1986

[54] GRAIN ELEVATOR

[75] Inventor: Klaus U. Driedger, Edmonton, Canada

[73] Assignee: Buffalo Beton Ltd., Calgary, Canada

[21] Appl. No.: 470,629

[22] Filed: Feb. 28, 1983

[30] Foreign Application Priority Data

Oct. 25, 1982 [CA] Canada .................................. 414123

[51] Int. Cl.$^4$ ............................................ E04H 7/00
[52] U.S. Cl. ...................................... 52/192; 52/197
[58] Field of Search ................ 52/587, 588, 192, 193, 52/194, 195, 196, 197, 259

[56] References Cited

U.S. PATENT DOCUMENTS

| | | |
|---|---|---|
| 281,214 | 7/1883 | Watson . |
| 597,879 | 1/1898 | Graver . |
| 704,805 | 7/1902 | Jamieson . |
| 867,962 | 10/1907 | Finton . |
| 1,520,073 | 9/1922 | Nothnagel . |
| 2,958,983 | 11/1960 | Hoover ................................. 52/192 |
| 3,319,807 | 5/1967 | Van Raden ........................... 52/192 |
| 3,373,536 | 3/1968 | Riembert ............................. 52/259 |
| 3,610,485 | 3/1970 | Van Raden . |
| 3,931,877 | 1/1976 | Albaugh . |
| 4,035,928 | 7/1977 | Sietmann et al. . |

FOREIGN PATENT DOCUMENTS

| | | |
|---|---|---|
| 767348 | 9/1967 | Canada . |
| 781642 | 4/1968 | Canada . |
| 927070 | 5/1973 | Canada . |
| 1120231 | 3/1982 | Canada . |
| 1126567 | 6/1983 | Canada . |
| 835782 | 9/1937 | France . |

Primary Examiner—Carl D. Friedman
Assistant Examiner—Creighton Smith
Attorney, Agent, or Firm—Burns, Doane, Swecker & Mathis

[57] ABSTRACT

A sloped bin grain elevator is formed of preformed structural components and has the bins therein sloped at or near the angle of repose at the stored material to create a non-confined grain flow pattern. The elevator building structure includes an inclined base, a sloped roof and side walls as well as end walls and a plurality of interior partitioning walls. Each bin in the elevator has a series of staggered intermediate levels so as to divide the depth of the bin into various layers. The staggered intermediate levels of the bins are formed by a series of precast slabs, the width of each slab being slightly less than half the width of the bin, the slabs being positioned end to end in a staggered pattern whereby the entire length of each bin forms one intermediate continuous layer of slabs.

5 Claims, 22 Drawing Figures

GRAIN ELEVATOR

FIELD OF THE INVENTION

This invention relates to elevators for storing granular materials, and in particular to grain elevators.

In the following description the term "granular material" is intended to mean any grain-like material such as those stored in silos and grain elevators. While the primary purpose of the elevator of the present invention is for storing grain, it can also be used for storing other granular materials such as bulk fertilizer.

BACKGROUND OF THE INVENTION

The basic design of grain elevators has not changed substantially for many years. U.S. Pat. Nos. 281,214, W. Watson, July 10, 1883; 867,962, W. L. Finton, Oct. 15, 1907; 1,580,073, W. O. Nothnagel, April 6, 1926; and 3,931,877, L. L. Albaugh, Jan. 13, 1976, are representative of the prior art.

Canadian Pat. Nos. 1,120,281 and 1,126,467 issued to Buffalo Beton Ltd. provided substantial improvements to the art in disclosing construction of an elevator in pre-fabricated form.

The pre-fabricated grain elevator in Canadian Pat. No. 1,120,231 relates to a structure for storing granular material comprised of a plurality of parallel, vertically extending rows of inclined bins, each bin being discrete with respect to all adjacent bins. Each bin is charged at the upper end by means of a vertical passage in a precast concrete feed manifold for each vertical row of bins. Each bin is discharged at a normally closed lower end utilizing a similar fluted manifold.

The bins in U.S. Pat No. 1,120,231 are defined by modules in the form of preformed, reinforced concrete sections, which are readily interconnected on site for quick construction of an elevator. In the preferred form, the sections and consequently the bins are rectangular in cross-sectional configuration, with a bottom wall and integral side walls. When the sections are interconnected end-to-end they form an elongated sloping bin. A plurality of bins are stacked one on top of another to form a vertical row of bins, the top of each bin being closed by a superjacent bin, the tops of the uppermost bins being closed by a roof.

The granular material process, i.e., the movements of the grain to, through and from the elevator utilizes conventional material handling devices and machinery. Grain carried to the elevator in trucks is weighed and fed into receiving pits; bucket conveyors elevate the grain vertically; screw conveyors transport the grain laterally; and the precast concrete feed manifolds, complete with sliding plugs, controls charging and discharging operations from individual bins.

One of the objectives of the pre-fabricated grain elevator in Canadian Pat. No. 1,120,231 was to alleviate, at least partially, the hazard of fire and explosion propagation throughout the structure. This was accomplished by means of self-contained, entirely closed individual bins utilizing explosion relief in the form of end wall panels. Another objective of the elevator was the use of pre-formed structural components to alleviate the problem of maintaining a large work force and comprehensive fabrication control in remote areas where elevators are usually required. The prefabricated units are manufactured in a factory-controlled environment and shipped to a site for assembly. A third objective of the elevator was to alleviate the problem of overpressures on the bin walls during filling and emptying. These pressures are difficult to determine and costly to design for. There have been dramatic elevator failures resulting from the improper calculation of these overpressures.

The above-described pre-fabricated grain elevator and its sloping storage bin concept is a new improvement to the state of the art in elevator design and construction. However, the development of this art has not remained static. The present invention encompasses the important fundamental concepts of the aforementioned pre-fabricated grain elevator and it expands on these concepts to include new and unobvious improvements.

The improvements of the present invention relate to alleviating, at least partially, the problem of overpressure exerted on bin walls during filling and emptying of deep bins. The pre-fabricated grain elevator described in Canadian Pat. No. 1,120,231 partially alleviated this problem by sloping the bins at or near the angle of repose of the stored material, thereby creating a non-confined grain flow pattern, i.e. a grain flow pattern where the moving particles are on or near a free surface. However, the structure in Canadian Pat. No. 1,120,231 restricted the storage bin height and was therefore only workable with relatively shallow bins. The design of deep bins reverted back to the conventional vertical storage facilities with their aforementioned problems. The design of conventional deep bins ultimately requires an educated guess at the design overpressure values. One feature of the present invention is to eliminate the shallow bin constraint associated with the prior art and provide complete flexibility in storage bin depth and shape. The improvements according to the present invention remove the uncertainty in deep storage bin design by eliminating the phenomenon of overpressure in deep bins.

SUMMARY OF THE INVENTION

In a broad aspect the present invention relates to an elevator for storing granular material and comprised of a row of polygonally-shaped bins, each bin being discrete with relation to all adjacent bins. More specifically, the elevator according to the invention comprises a building defined by an inclined base supported on vertical columns from a base or foundation, a pitched roof, a pair of side walls, a plurality of end walls and a plurality of parallel interior partitioning walls.

In another aspect the present invention provides a sloped bin grain elevator formed of pre-formed structural components and having the bins therein sloped at or near the angle of repose of the stored material to create a non-confined grain flow pattern; the improvement comprising providing flexibility in the depth and shape of said bins comprising a building structure defined by an inclined base, vertical columns supporting said inclined base, a sloped roof, side and end walls and a pluarlity of interior partitioning walls; a row of polygonally-shaped bins, each bin being discrete in relation to adjacent bins; each bin having a series of staggered intermediate levels to divide the depth of the bin into layers.

The individual bins are defined by the building outlines forming their perimeter and a pair of adjacent interior partitioning walls forming their sides. The depth of the bin is layered with intermediate levels consisting of a series of precast reinforced concrete slabs. The slope and arrangement of these slabs are essential to the overall design as their positioning affects the flow of grain through the bin. The width of each slab is slightly less than half the bin width. The slabs are positioned end-to-end in a staggered pattern, the entire length forming one intermediate continuous layer of slabs. The position of the slabs in one layer is also alternated with relation to their superjacent layer, i.e. the first slab would be positioned in one half of the bay while the next slab would be positioned in the other half and so on, while in the subjacent layer the first slab would be positioned in the opposite half bay and so on, the layers thereby forming a sieve-like arrangement of alternating "checkerboard" patterned levels. The bottom level of each bin is a closed level utilizing a continuous double row of slabs placed end-to-end and side-by-side. These slabs are specially fitted with flanges to form a sealed hoppered bottom for the bin. The bottom slabs directly adjacent the discharge point are fitted with spouted ends. All slabs, intermediate or bottom, span lengthwise and bear on crossbeams. The cross-beams span the width and are supported at each end by the bin side-wall.

The bin side-walls are constructed from composite cast-in-place and precast concrete. Preformed reinforced concrete wall panels are fabricated under factory-like conditions and assembled on site. These side wall panels are stacked in rows of vertical columns and joined at their ends by cast-in-place concrete pilasters. The height of each stack of wall panels and its borders is dependent upon the overall bin shape. Therefore, the vertical stacks of wall panels can be varied to conform to virtually all required bin cross-sectional shapes.

The bin end-walls are constructed in the same manner as the bin side-walls utilizing similar side-wall panels.

BRIEF DESCRIPTION OF THE DRAWINGS

The invention is illustrated in the accompanying drawings in which.

DESCRIPTION OF THE PREFERRED EMBODIMENT

Figure 1:
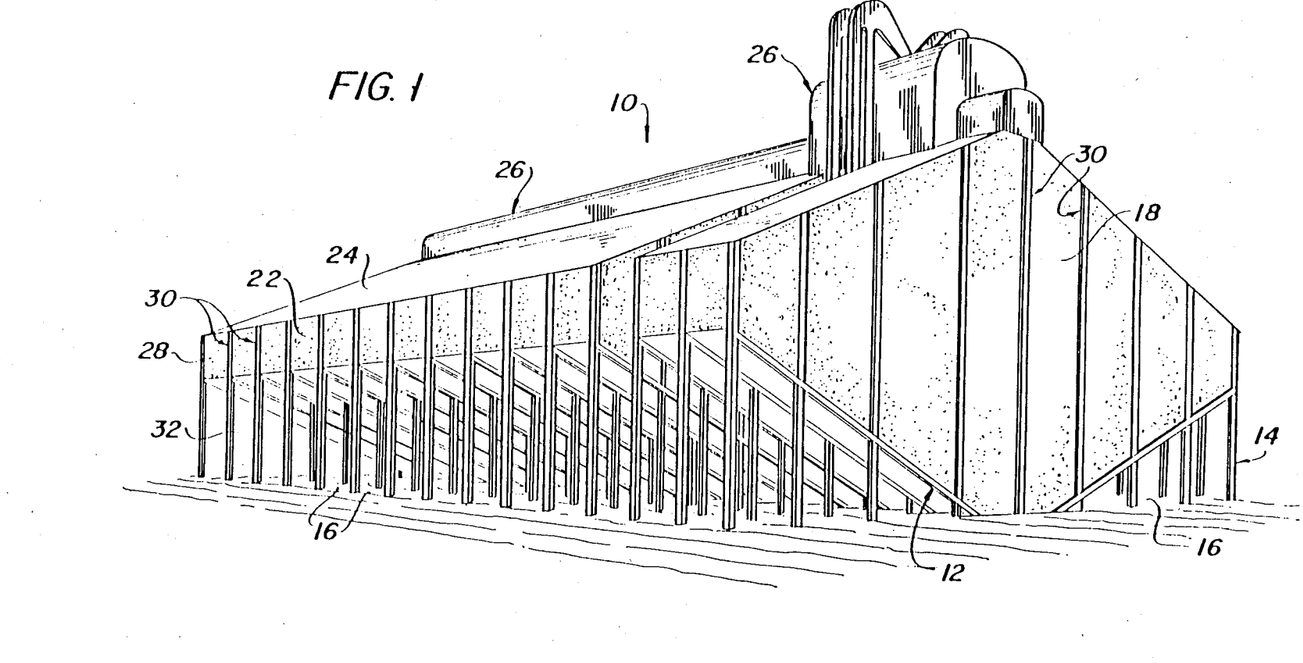
FIG. 1 is a perspective view of a grain elevator in accordance with the present invention.
Figure 2:
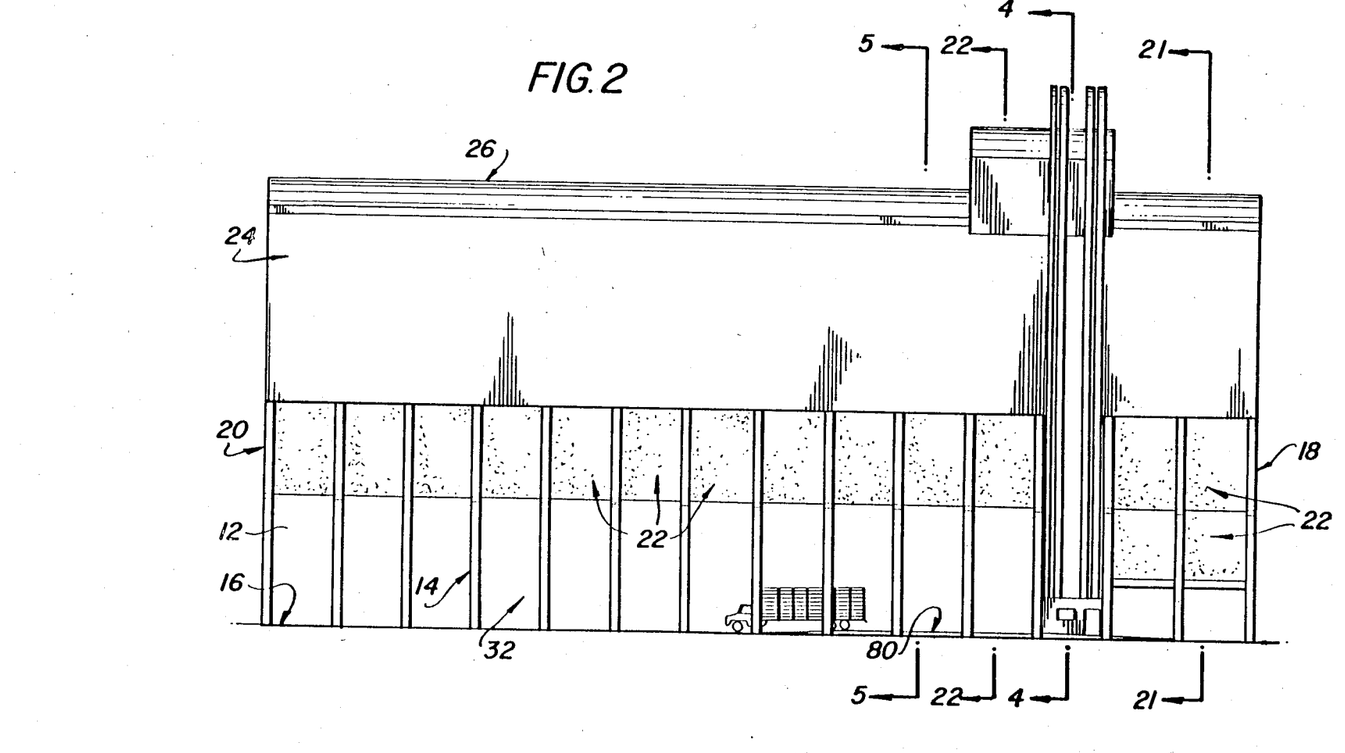
FIG. 2 is an end view of the grain elevator in FIG. 1.
Figure 3:
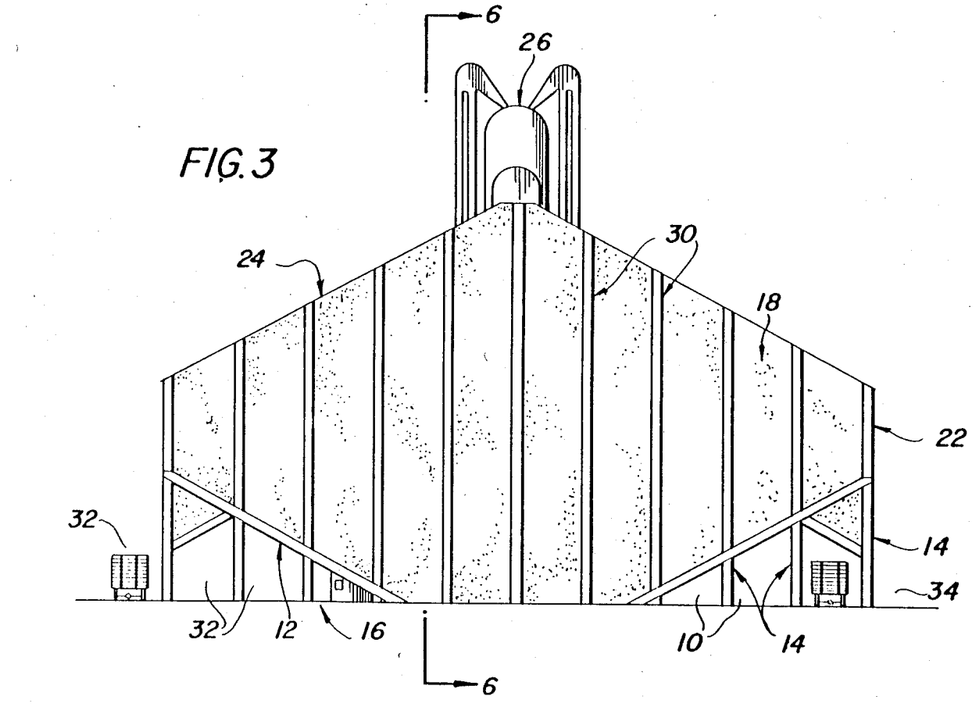
FIG. 3 is the side view of the grain elevator illustrating the side opposite that shown in FIG. 1.

With reference to the drawings and in particular to FIGS. 1 to 3, the grain elevator 10 of the present invention is defined by an inclined bottom floor level or hoppered bin-bottom 12, supported on columns 14, from a foundation or base 16; a pair of side walls 18 and 20; a pair of end walls 22; and an inclined roof 24. A cowl 26 extends the entire length of the structure at the apex thereof.

Except for the cowl 26 and the roof 24 which are preferably formed of metal, the elevator 10 is constructed mainly of precast and cast-in-place reinforced concrete. For example, the side and end walls 18, 20 and 22 respectively are formed by precast wall panels 28 and cast-in-place pilasters 30.

Figure 4:
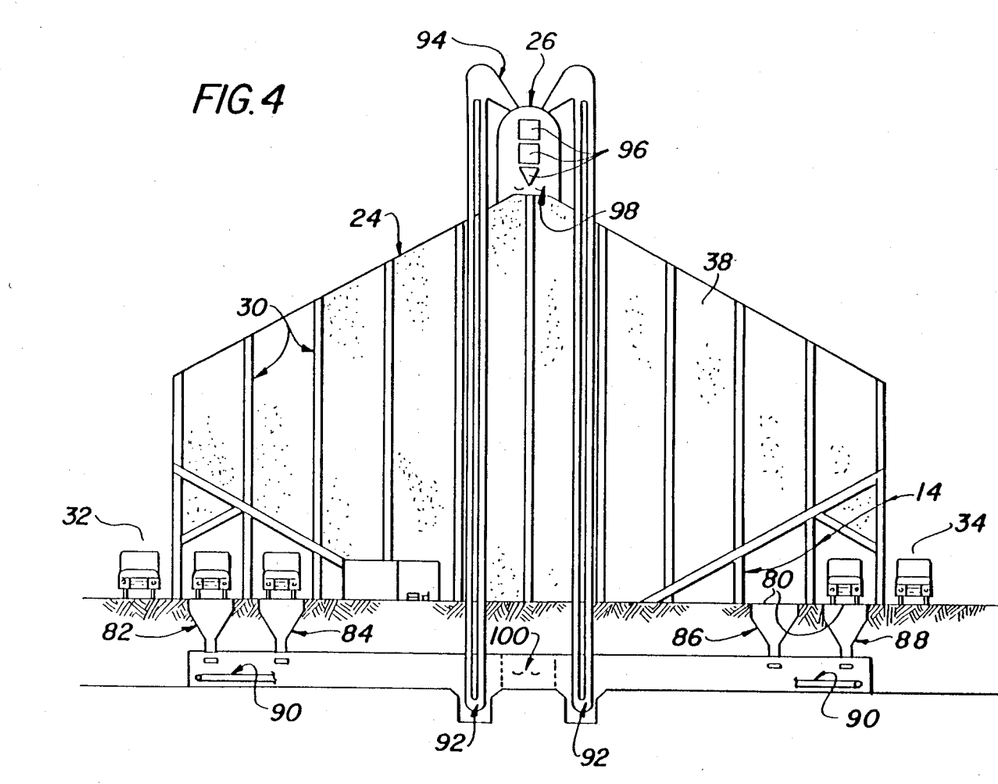
FIG. 4 is an intermediate side view, partly in section, of the grain elevator generally taken along the line 4—4 of FIG. 2 illustrating the grain receiving and distributing systems.

The lower area of the elevator generally indicated at 32 is a service area devoted to receiving equipment and controls for operating the elevator as well as warehouse, office and retail space. A truck shown in FIGS. 2, 3 and 4 can enter the building at one end in any one of the four outside bays, deliver grain, and leave at the other end. Trucks, rail cars or ships (not shown) can receive grain along either end 32, 34 of the structure as shown in FIGS. 3 and 4.

Figure 5:
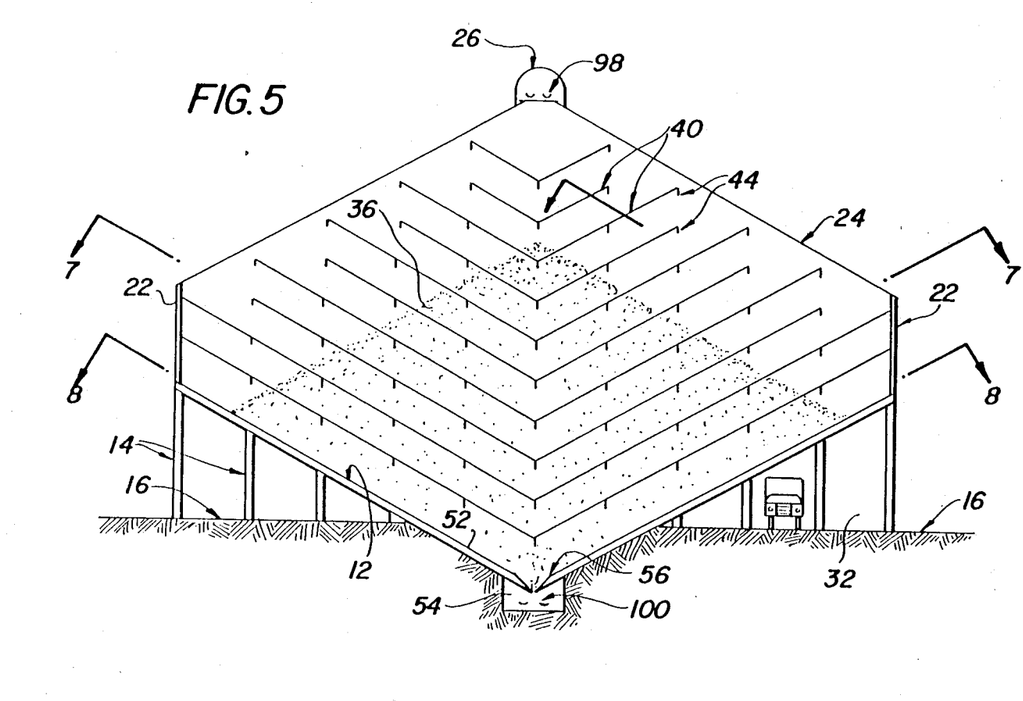
FIG. 5 is a cross-sectional view generally taken along the line 5—5 of FIG. 2.
Figure 6:
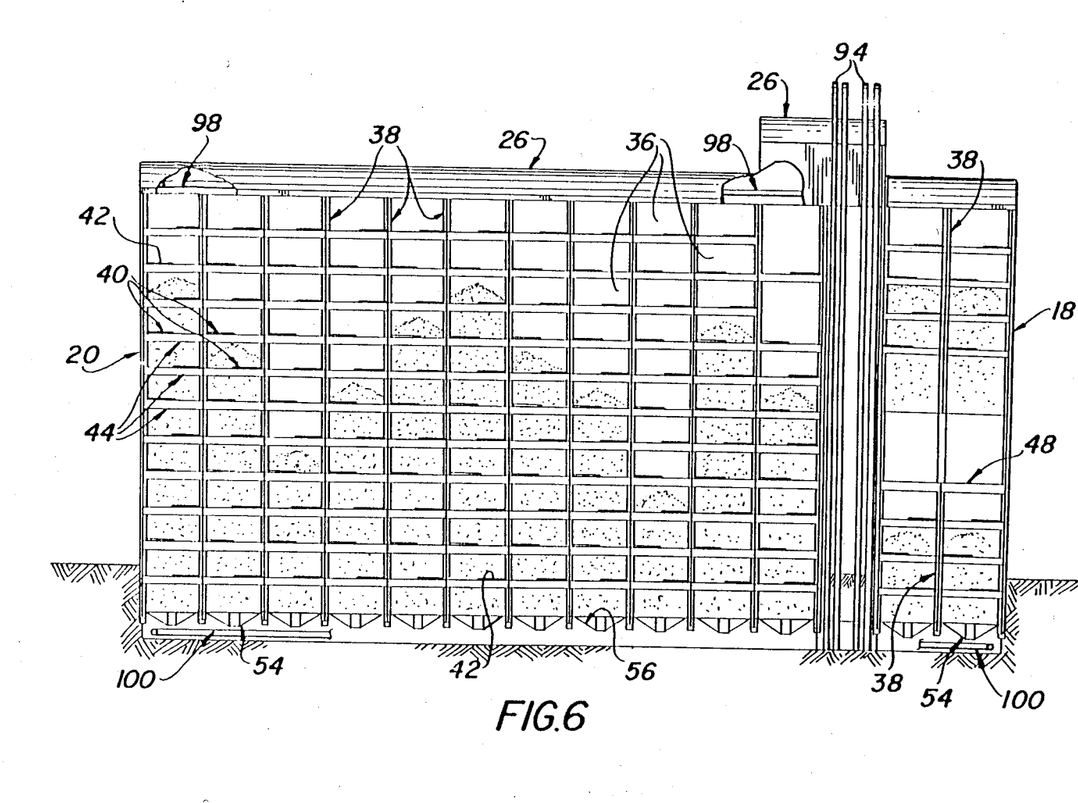
FIG. 6 is a cross-sectional view generally taken along the line 6—6 in FIG. 3.

As best illustrated in FIGS. 5 and 6 a row of bins 36 with inclined bottoms 12 for storing grain or another granular material are located above the lower service. The bins 36 are defined by the building outlines, i.e. the roof 24 of the building is the roof of the bins, the end walls 22 of the building are the bins' end walls, the inclined bottom floor level 12 of the building is the hopper bottom of the bins, and the plurality of interior partitioning walls 38 defines the individual side walls of the bins.

Referring to FIGS. 5 to 20, the bins 36 are formed by reinforced concrete side walls 22, partition walls 38 and inclined bin-bottoms 12 with the inclined metal roof 24. The bin walls 22 and 38 are formed by pre-formed reinforced concrete wall sections 28 spanning between cast-in-place concrete columns or pilasters 30. The wall is constructed by stacking the precast wall sections 28 in a row of columns and casting reinforced concrete into the joints of their abutting ends.

Figure 7:
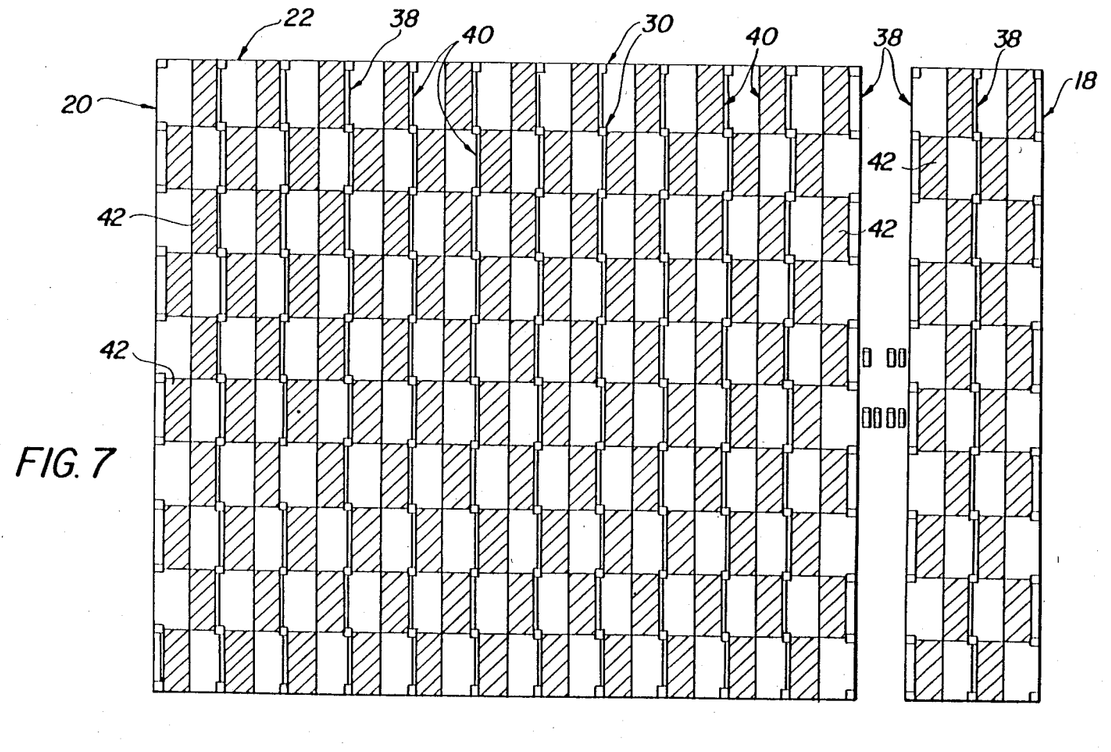
FIG. 7 is a plan-sectional view generally taken along line 7—7 in FIG. 5 illustrating an intermediate slab level across the bins.
Figure 13:
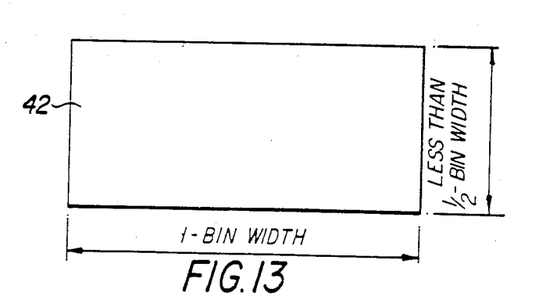
FIG. 13 is a plan view of a preformed reinforced concrete slab used in the intermediate slab levels of the bins.
Figure 14:
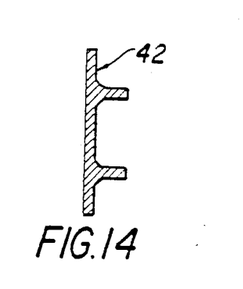
FIG. 14 is an end view of a slab in FIG. 13.
Figures 15, 16:
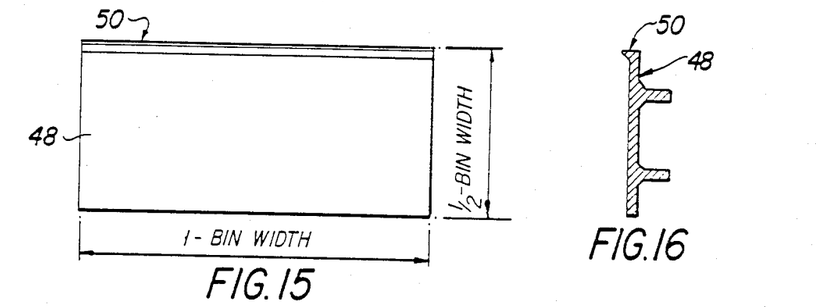
FIG. 15 is a plan view of a preformed reinforced concrete slab used in the bottom level of the bins.
FIG. 16 is an end view of a slab shown in FIG. 15.
Figure 17:
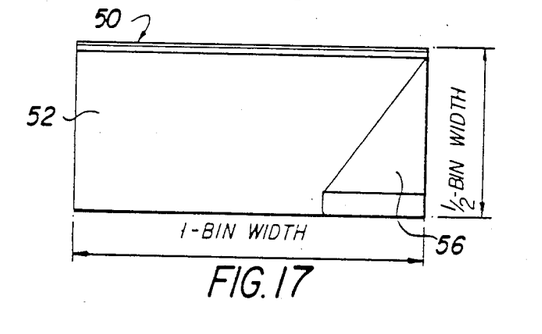
FIG. 17 is a plan view of a preformed reinforced concrete slab used in the bottom level of a bin immediately adjacent the discharge point.
Figure 18:
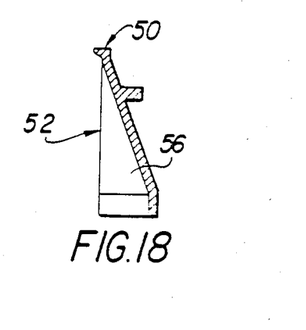
FIG. 18 is an end view of a slab shown in FIG. 17.
Figure 19:
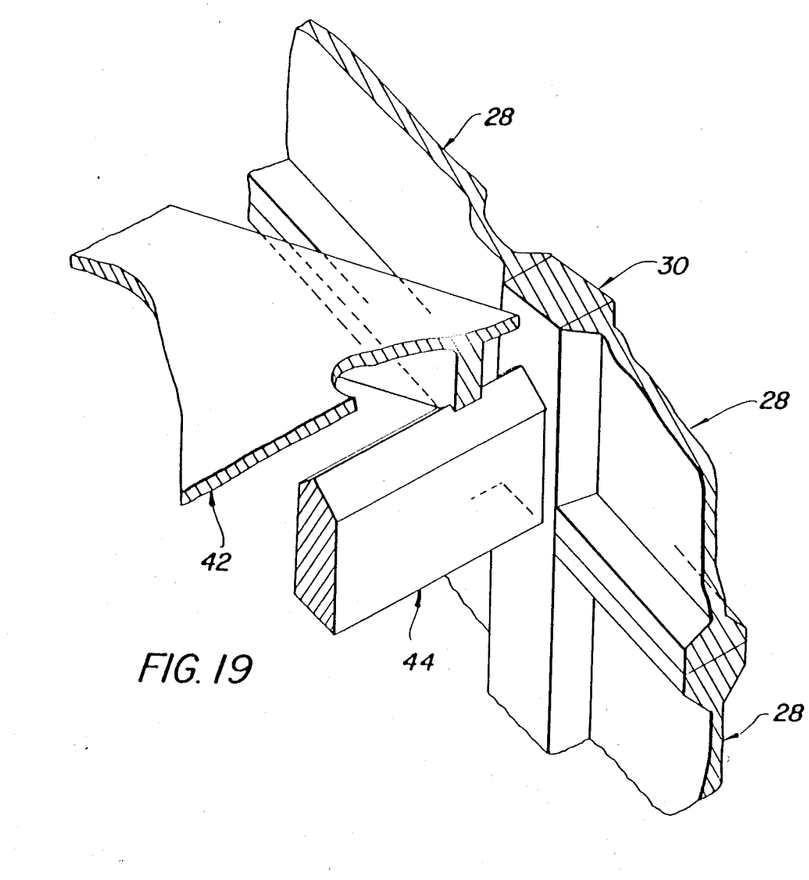
FIG. 19 is an isometric, cut-away view showing the general arrangement of the components of the wall system at an intermediate slab level and typical side wall.

The bins 36 are layered with intermediate inclined slab levels 40 as shown in FIGS. 5, 6 and 7. The intermediate slab levels 40 are formed by positioning individual precast concrete slabs 42 which are less than half the bin width as shown in FIGS. 13 and 14 in a staggered pattern, end-to-end, i.e. one slab 42 is placed adjacent to the left side wall, the next adjacent to the right side wall and so on until the slab layer is complete. A checkered slab arrangement is created comprised of a regular configuration of open spaces and solid slabs as best illustrated in plan view of FIG. 7. The individual slabs 42 are also staggered with respect to their superjacent slabs. Thus the checker-board arrangement is also alternated at each slab level and best illustrated in FIGS. 6, 9 and 10. The individual slabs 42 are supported at each end by reinforced concrete beams 44 which span to the bin sidewalls 38.

Figure 8:
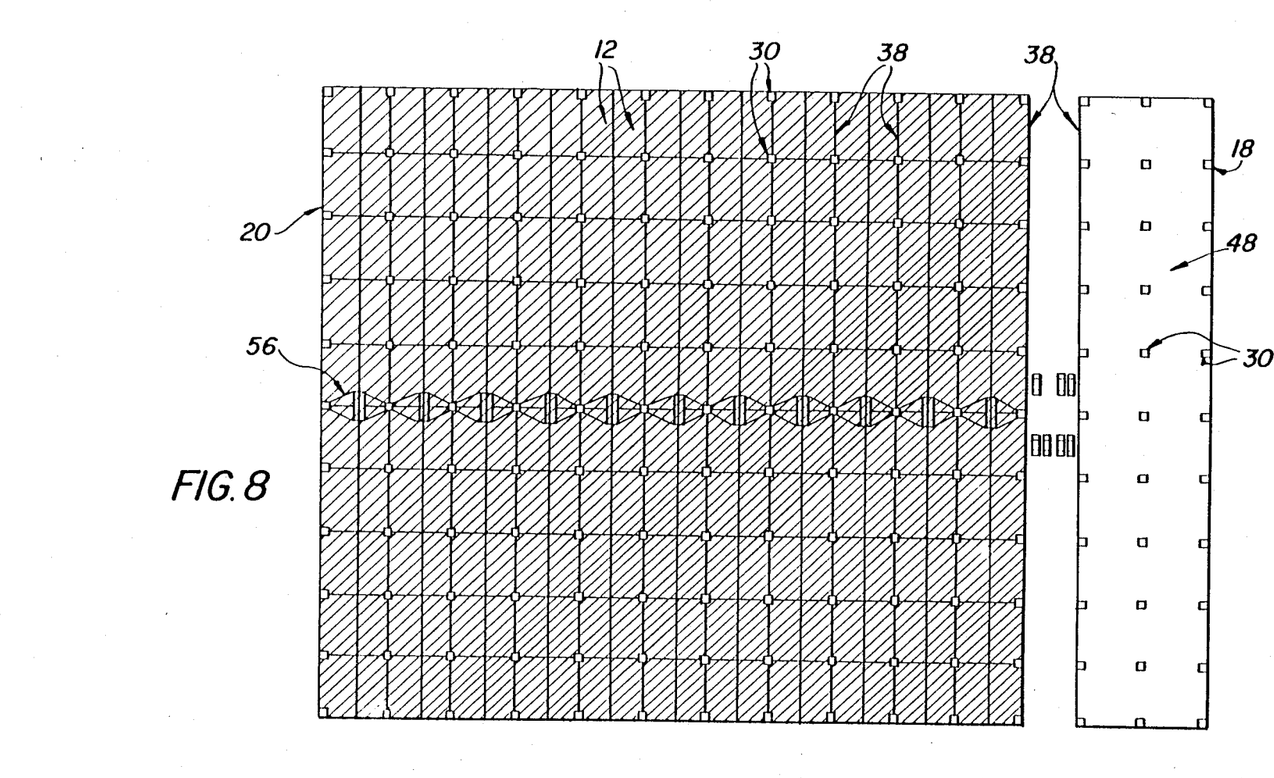
FIG. 8 is a plan-sectional view generally taken along the broken line 8—8 in FIG. 5 illustrating the sealed bottom slab level across the bins.
Figure 9:
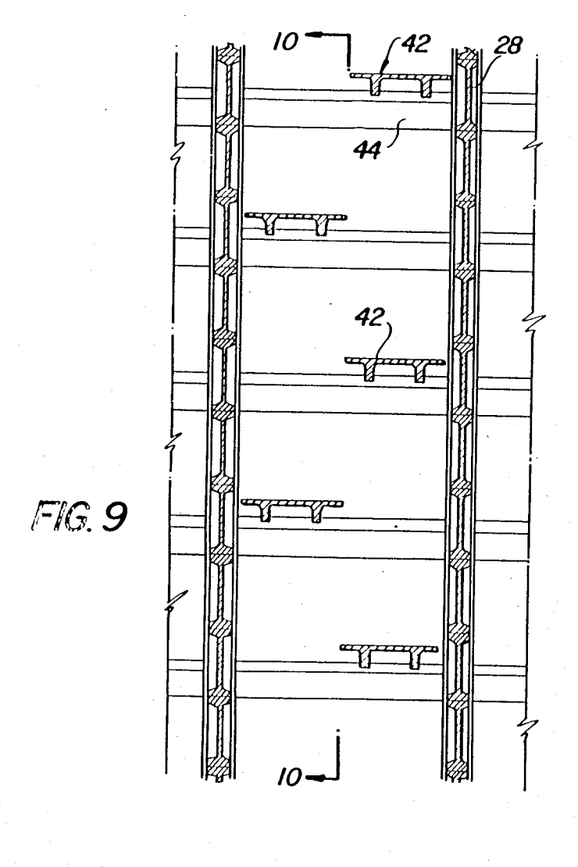
FIG. 9 is a partial cross-sectional view of the elevator showing an enlarged portion of the cross-section of FIG. 6.
Figure 10:
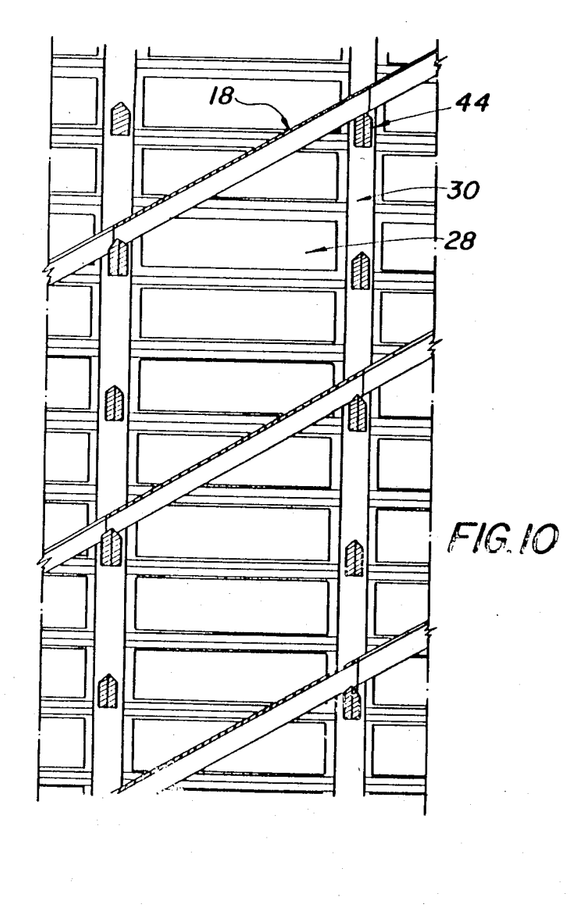
FIG. 10 is a cross-sectional view of the bin section generally taken along line 10—10 shown in FIG. 9.
Figure 11:
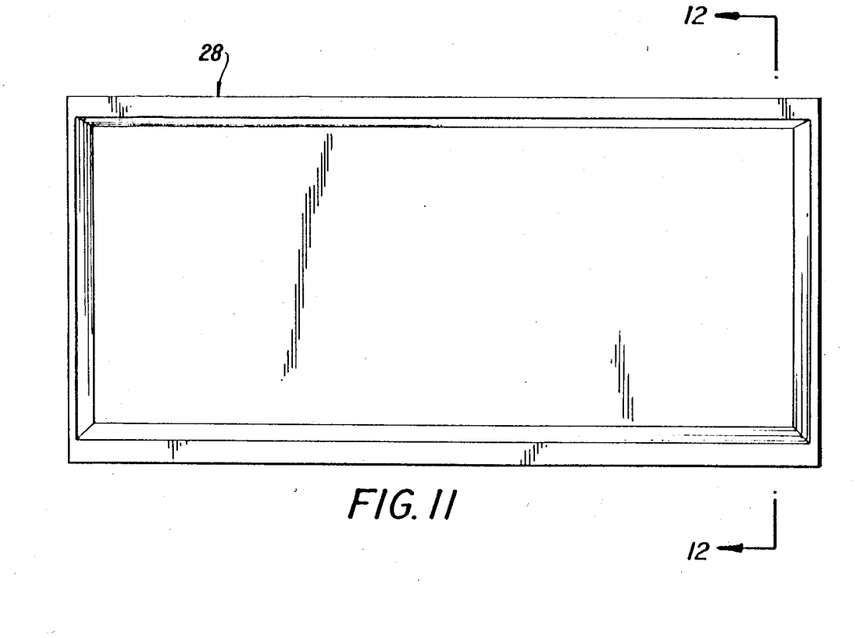
FIG. 11 is an elevation view of a preformed reinforced concrete wall panel of the elevator.
Figure 12:
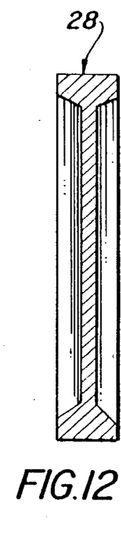
FIG. 12 is a cross-sectional view of a wall panel generally taken along line 12—12 in FIG. 11.
Figure 20:
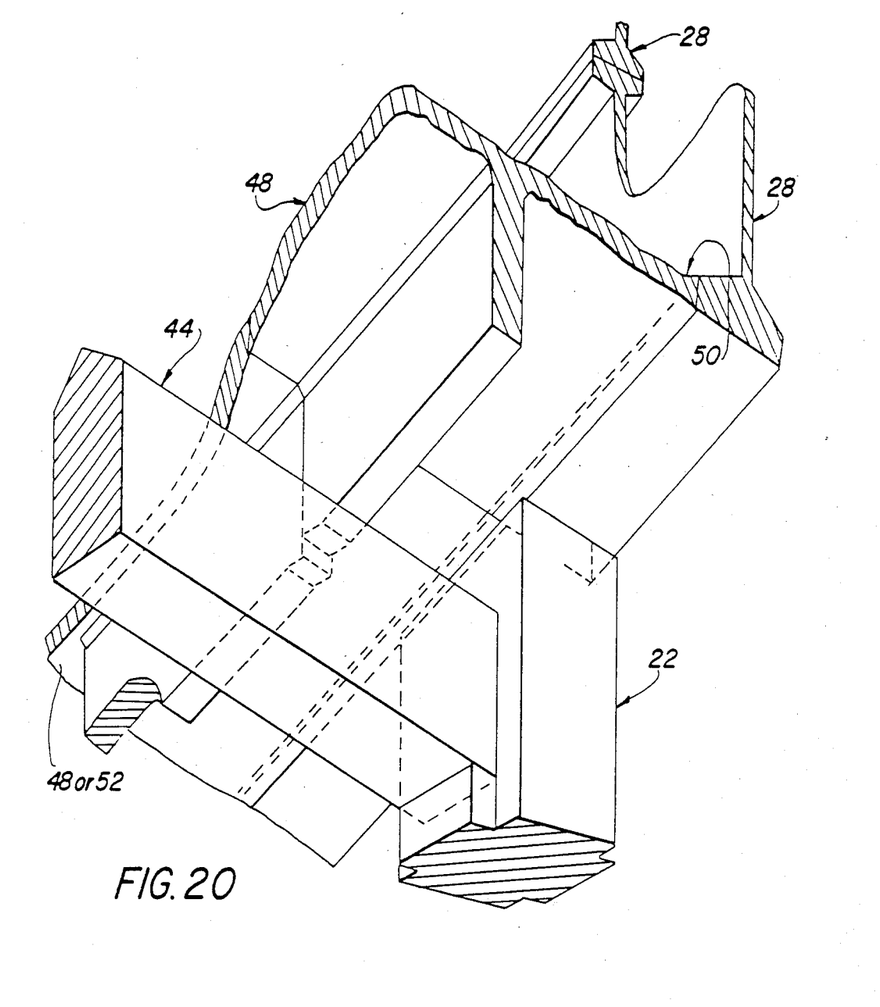
FIG. 20 is a perspective cut-away view of the bottom floor level at the intersection of the bin side wall and supporting column.

The bottom floor level 12 of each bin 36 is formed by a double row of preformed reinforced concrete slabs 48 as seen in FIGS. 8 and 20. These bottom slab sections 48 are provided with flanges 50 at the side of the slab that will be placed adjacent to the walls 38. They are positioned side-by-side as well as end-to-end to form a solid surface as best illustrated in FIG. 8. The bottom slab sections 48 are also supported at each end by the reinforced concrete beams 44. The slab sections 52 in the bottom level of the bin immediately adjacent to the bin discharge location 54 shown in FIGS. 5 and 6 are formed with a depression 56 at their lower ends. When these sections 52 are erected into place the depressions 56 form a spout to guide the granular material to the exact discharge point 54.

The bins 36 are supported on an incline by rows of columns 14. The height of the columns 2 vary to form the desired degree of incline in the bins as shown in FIGS. 3–5.

The bins 36 are covered with an inclined metal roof 24 which is fastened along the top edge of the bin walls.

Figure 21:
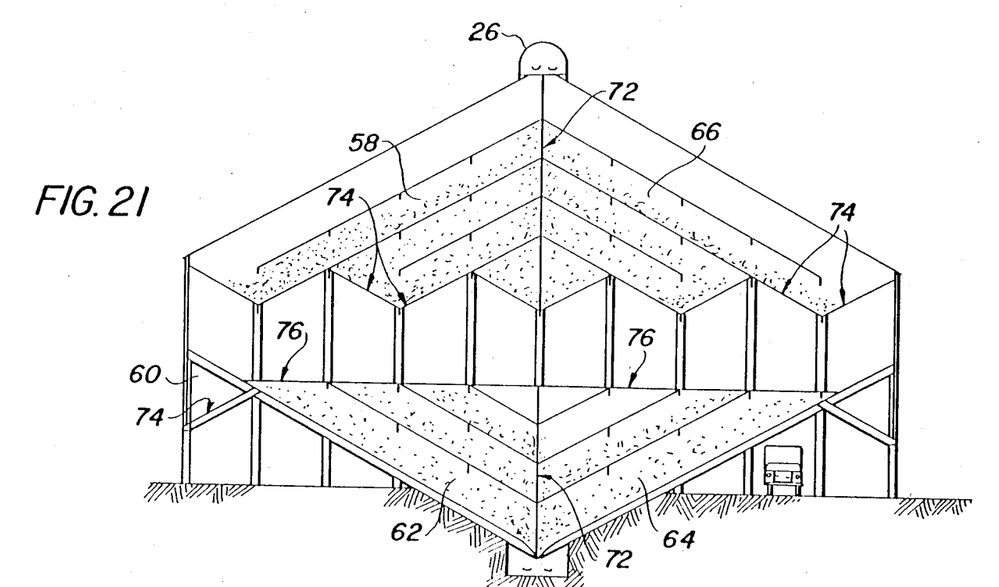
FIG. 21 is a cross-sectional view generally taken along line 3—3 in FIG. 2 and illustrates the grain cleaning bins.
Figure 22:
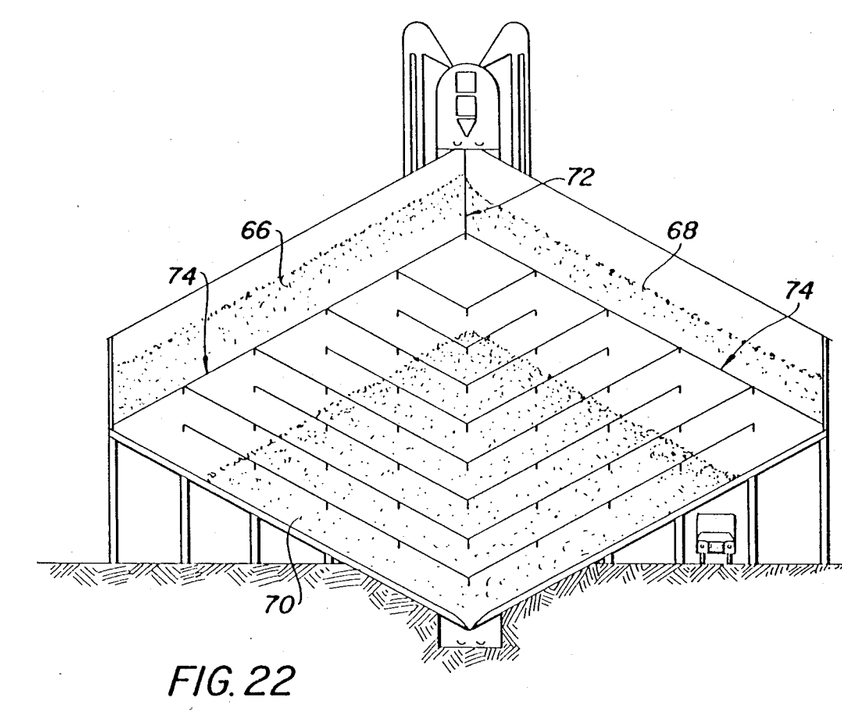
FIG. 22 is a cross-sectional view generally taken along line 4—4 of FIG. 2 and illustrates the aeration and drying bins.

The bins 36 as shown in the cross-sectional view in FIG. 5 can be subdivided into smaller bins 58 to 70 as best illustrated in FIGS. 21 and 22. These smaller bins 58 to 70 are formed by the addition of intermediate vertical walls 72 and intermediate, sealed bottom levels 74. As well, the bins 36 can be divided with level floor areas 76 which can be used for machinery, office or warehouse space.

The movement of granular material through the building and in and out of the bins 36 is accomplished by use of conventional material handling equipment and methods.

Referring to FIGS. 4 to 6, a truck 32 carrying grain upon entering the building 10 stops on a truck scale 80 located in any of the four truck lanes shown in FIG. 4. Grain from the truck is dumped into one of the receiving pits 82 to 88. Grain flowing from the bottom of the receiving pits 82 to 88 enters one end of a horizontal drag conveyor 90 transporting grain laterally towards the centre of the building. Grain is discharged from the central end of the drag conveyors 90 into the boot of the vertical bucket elevators 92 carrying grain to the top of the elevator. Grain is discharged from the top of the bucket elevators 96 through nozzles in its top hood into grain scale equipment 96 where the grain is accurately weighed. From the bottom of the grain scale equipment 96, the grain is dumped onto a horizontal belt conveyor 98 which carries the grain the length of the building along the apex of the inclined roof 24. From the belt 98, the grain is dumped into any one of the desired bins 36 by means of a conveyor belt tripper, not shown.

Grain is withdrawn from the lowest point of the bin 54 by opening discharge gates located near the reinforced concrete spouts 56. The grain falls through the gates onto horizontal conveyor belts 100 which transports the grain along the building's length to the boot of the buck elevators 92 where the grain can be re-elevated for further distribution.

The elevator of the present invention maintains the features of the Pre-fabricated grain elevator described in Canadian Pat. Nos. 1,120,231 and 1,126,467 and eliminates the restriction of relatively shallow bin depths in conventional elevators. The elevator of the present invention is capable of extremely high through-put, is flexible in terms of capacity, and is relatively efficient.

The slope of the intermediate and bottom levels of bins may be important depending on the type of material being stored in the elevator. The usual slope of the levels is 30 degrees. However, any slope is acceptable for filling, the preferred range of slope being 22.5 degrees to 30 degrees. Emptying can be effected over a wide range of slopes, except that a thin layer of grain is left on the bin floor and intermediate bin slab with lesser slopes. Usually this is not tolerable, therefore a minimum slope of 30 degrees is preferred.

The building described herein is intended to have a capacity of approximately 1,101,000 bushels of wheat. The building requires less materials to construct than an equivalent structure using conventional vertical storage or the sloping bin storage described in Canadian Pat. No. 1,120,231. The elevator capacity can be expanded by the addition of bays to either side of the building thereby increasing the building length.

The present invention has additional features such as a relatively high degree of flexibility in terms of bin size and utilization. Unlike conventional elevators, virtually all bin space is utilized. The preferred bin cross-sectional, hexagonal shape as illustrated maximizes the natural laws of gravity affecting the stored material thereby assisting grain flow characteristics, while eliminating the phenomenon of overpressures. Moreover, the preferred cross-section shape optimizes the use and layout of grain handling equipment. Less equipment is required to provide an equivalent level of service that is provided in conventional facilities. As well, the grain handling equipment can be centralized allowing the entire elevator operation to be handled by fewer personnel. The checkerboard-like arrangement of concrete slabs in the bins also reduces the degradation of the stored material because of the relatively shallow net fall heights for the grain. The chronological flow of granular material during emptying generally follows the rule of "first grain in is the first grain out". The feature facilitates the quality control and blending operations in the elevator.

Any bin can be converted to a number of smaller sloped bins by sealing intermediate slab levels. As well, a bin can be sub-divided, with relative ease, into level floor areas which can be user for machinery, office or warehouse space.

The essential structure components of the elevator are pre-fabricated under factory-like conditions and assembled at the site. Cast-in-place reinforced is beneficially utilized to join the pre-fabricated components forming a smooth, neat, and continuously sealed system.

Finally, the elevator is designed to reduce the danger of fire and explosion to a minimum. Unlike most conventional grain storage facilities, the present invention follows recent North American guidelines with respect to fire and explosion prevention. The conventional facilities utilizing vertical storage are more susceptible to extreme fire and explosion damage and propogation because the relatively small explosion relief area at the top of each vertical bin is enclosed by a machinery floor level and covering structure. The present invention provides a relatively large area of explosion relief through the roof. If fire or explosion occurs in one area, damage is restricted to such area and does not quickly spread to the remainder of the elevator.

While the invention has been described in connection with a specific embodiment thereof and in a specific use, various modifications thereof will occur to those skilled in the art without departing from the spirit and scope of the invention as set forth in the appended claims.

The terms and expressions which have been employed in the specification are used as terms of description and not of limitation and there is no intention in the use of such terms and expressions to exclude any equivalents of the features shown and described or portions thereof. It is recognized that various modifications are possible within the scope of the invention as claimed.

I claim:

1. In a sloped bin grain elevator constructed of preformed structural components and having the bins therein sloped at or near the angle of repose of the stored material to create a non-confined grain flow pattern; the improvement to provide flexibility in the depth and shape of said bins comprising:
   a building structure defined by an inclined base, vertical columns supporting said inclined base, a sloped roof, side and end walls and a plurality of interior partitioning walls;
   a row of polygonally-shaped bins, each bin being discrete in relation to adjacent bins;
   each bin having a series of staggered intermediate levels to divide the depth of the bin into layers;
   said staggered intermediate levels of said bins comprising a series of precast slabs, the width of each slab being slightly less than half the width of said bin, said slabs being positioned end-to-end in a staggered pattern whereby the entire length of each bin forms one intermediate continuous layer of slabs.

2. A sloped bin elevator according to claim 1 wherein each bin is defined by the side walls of said building and a pair of adjacent interior partitions.

3. A sloped bin elevator according to claim 1 wherein the bottom surface of each bin is closed by means of a double row of slabs.

4. A sloped bin elevator according to claim 1 including crossbeams spanning the width of said elevator and supported at each end by the side walls of said bins, said side walls being formed of stacked rows of preformed panels joined at their ends by cast-in-place pilasters.

5. In a sloped bin grain elevator constructed of preformed structural components and having the bins therein sloped at or near the angle of repose of the stored material to create a non-confined grain flow pattern; the improvement to provide flexibility in the depth and shape of said bins comprising;
   a building structure defined by an inclined base, vertical columns supporting said inclined base, a sloped roof, side and end walls and a plurality of interior partitioning walls;
   a row of polygonally-shaped bins, each bin being discrete in relation to adjacent bins;
   each bin having a series of staggered intermediate levels to divide the depth of the bin into layers;
   the staggered intermediate levels of said bins comprising a series of precast slabs, the width of each slab being slightly less than half the width of said bin, said slabs being positioned end-to-end in a staggered pattern whereby the entire length of each bin forms one intermediate continuous layer of slabs; and
   wherein the position of the slabs in one layer is alternated in relation to the slabs in a superjacent layer whereby the layers of slabs form a sieve-like arrangement.

* * * * *